US008578192B2

(12) United States Patent
Vasquez et al.
(10) Patent No.: US 8,578,192 B2
(45) Date of Patent: Nov. 5, 2013

(54) POWER EFFICIENT HIGH FREQUENCY DISPLAY WITH MOTION BLUR MITIGATION

(75) Inventors: Maximino Vasquez, Fremont, CA (US); Akihiro Takagi, San Mateo, CA (US); Yanli Zhang, San Jose, CA (US); Achintya K. Bhowmik, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 12/165,249

(22) Filed: Jun. 30, 2008

(65) Prior Publication Data

US 2009/0327777 A1 Dec. 31, 2009

(51) Int. Cl.
*G06F 1/32* (2006.01)
*G09G 5/00* (2006.01)

(52) U.S. Cl.
USPC ............................ 713/320; 345/211; 345/212

(58) Field of Classification Search
USPC .......................................................... 713/320
See application file for complete search history.

(56) References Cited

U.S. PATENT DOCUMENTS

| | | | | |
|---|---|---|---|---|
| 4,800,431 | A | 1/1989 | Deering | |
| 5,418,572 | A | 5/1995 | Nonweiler et al. | |
| 5,446,496 | A | 8/1995 | Foster et al. | |
| 5,576,738 | A | 11/1996 | Anwyl et al. | |
| 5,872,588 | A | 2/1999 | Aras et al. | |
| 5,991,883 | A | 11/1999 | Atkinson | |
| 6,262,695 | B1 | 7/2001 | McGowan | |
| 6,624,800 | B2 | 9/2003 | Hughes et al. | |
| 6,678,834 | B1 | 1/2004 | Aihara et al. | |
| 6,801,811 | B2 | 10/2004 | Ranganathan et al. | |
| 6,900,820 | B2 * | 5/2005 | Kataoka et al. | 345/690 |
| 7,119,803 | B2 * | 10/2006 | Stanley et al. | 345/211 |
| 7,164,284 | B2 | 1/2007 | Pan et al. | |
| 7,190,361 | B2 | 3/2007 | Igarashi et al. | |
| 7,212,193 | B2 | 5/2007 | Ueda | |
| 7,233,309 | B2 * | 6/2007 | Diefenbaugh et al. | 345/102 |
| 7,499,043 | B2 * | 3/2009 | Vasqnez et al. | 345/212 |
| 7,538,762 | B2 | 5/2009 | Fletcher et al. | |
| 7,692,642 | B2 * | 4/2010 | Wyatt | 345/211 |
| 7,692,649 | B2 | 4/2010 | Elsberg et al. | |
| 7,876,313 | B2 | 1/2011 | Selwan et al. | |
| 7,898,535 | B2 * | 3/2011 | Juenger | 345/204 |
| 7,916,111 | B2 | 3/2011 | Kim et al. | |

(Continued)

FOREIGN PATENT DOCUMENTS

| | | | |
|---|---|---|---|
| CN | 1812524 | A | 8/2006 |
| CN | 101093658 | A1 | 12/2007 |

(Continued)

OTHER PUBLICATIONS

Non Final Office Action received for U.S. Appl. No. 11/027,113, mailed on Feb. 25, 2008, 13 pages.

(Continued)

*Primary Examiner* — Suresh Suryawanshi
(74) *Attorney, Agent, or Firm* — Caven & Aghevli LLC

(57) ABSTRACT

Some embodiments describe techniques that relate to power efficient, high frequency displays with motion blur mitigation. In one embodiment, the refresh rate of a display device may be dynamically modified, e.g., to reduce power consumption and/or reduce motion blur. Other embodiments are also described.

20 Claims, 5 Drawing Sheets

(56) References Cited

U.S. PATENT DOCUMENTS

| | | | | |
|---|---|---|---|---|
| 2002/0075251 | A1 * | 6/2002 | Millman et al. | 345/211 |
| 2003/0179170 | A1 | 9/2003 | Lee | |
| 2005/0030306 | A1 | 2/2005 | Lan et al. | |
| 2005/0068311 | A1 | 3/2005 | Fletcher et al. | |
| 2005/0068343 | A1 | 3/2005 | Pan et al. | |
| 2005/0253833 | A1 | 11/2005 | Teshirogi et al. | |
| 2006/0132491 | A1 | 6/2006 | Riach et al. | |
| 2006/0146056 | A1 | 7/2006 | Wyatt | |
| 2006/0158416 | A1 | 7/2006 | Ku | |
| 2006/0206733 | A1 | 9/2006 | Ono | |
| 2007/0002036 | A1 | 1/2007 | Kardach et al. | |
| 2007/0063940 | A1 | 3/2007 | Juenger | |
| 2007/0146294 | A1 | 6/2007 | Nurmi et al. | |
| 2007/0146479 | A1 | 6/2007 | Huang et al. | |
| 2007/0159425 | A1 | 7/2007 | Knepper et al. | |
| 2007/0229487 | A1 | 10/2007 | Slavenburg et al. | |
| 2007/0279407 | A1 | 12/2007 | Vasquez et al. | |
| 2008/0018571 | A1 | 1/2008 | Feng | |
| 2008/0055318 | A1 * | 3/2008 | Glen | 345/501 |
| 2008/0068318 | A1 | 3/2008 | Kerwin | |
| 2008/0068359 | A1 | 3/2008 | Yoshida et al. | |
| 2008/0122813 | A1 | 5/2008 | Kim et al. | |
| 2008/0143728 | A1 * | 6/2008 | Gorla et al. | 345/501 |
| 2008/0231579 | A1 | 9/2008 | Vasquez et al. | |
| 2009/0237391 | A1 * | 9/2009 | Yanagi et al. | 345/213 |

FOREIGN PATENT DOCUMENTS

| | | | |
|---|---|---|---|
| CN | 101097377 | A | 1/2008 |
| CN | 101202033 | A | 6/2008 |
| JP | 60-83501 | A | 3/1994 |
| JP | 2001-296841 | A | 10/2001 |
| JP | 2002-091400 | A | 3/2002 |
| JP | 2002-169499 | A | 6/2002 |
| JP | 2003-098992 | A | 4/2003 |
| JP | 2003-233352 | A | 8/2003 |
| JP | 2004-177575 | A | 6/2004 |
| JP | 2005-091454 | A | 4/2005 |
| JP | 2006-236159 | A | 9/2006 |
| JP | 2008-134291 | A | 6/2008 |
| JP | 2008-139753 | A | 6/2008 |
| JP | 2008-527418 | A | 7/2008 |
| KR | 10-2006-0056407 | A1 | 5/2006 |
| KR | 10-2008-0000056 | A | 1/2008 |
| TW | I268356 | A | 12/2006 |
| TW | 200701784 | A | 1/2007 |
| WO | 2005/033919 | A | 4/2005 |
| WO | 2006/073900 | A2 | 7/2006 |

OTHER PUBLICATIONS

Non Final Office Action received for U.S. Appl. No. 11/027,113, mailed on Jul. 10, 2008, 12 pages.

Final Office Action received for U.S. Appl. No. 11/027,113, mailed on Nov. 26, 2008, 14 pages.

Non Final Office Action received for U.S. Appl. No. 11/027,113, mailed on May 21, 2009, 14 pages.

Non Final Office Action received for U.S. Appl. No. 11/442,798, mailed on Mar. 5, 2008, 12 pages.

Non Final Office Action received for U.S. Appl. No. 11/536,904, mailed on Jun. 12, 2009, 14 pages.

Final Office Action received for U.S. Appl. No. 11/536,904, mailed on Dec. 1, 2009, 15 pages.

Non Final Office Action received for U.S. Appl. No. 11/536,904, mailed on Jun. 3, 2010, 7 pages.

Non Final Office Action received for U.S. Appl. No. 11/726,912, mailed on Feb. 4, 2010, 8 pages.

Final Office Action received for U.S. Appl. No. 11/726,912, mailed on Jul. 22, 2010, 11 pages.

Office Action Received for Chinese Patent Application No. 200910139641.4, mailed on Apr. 29, 2011, 6 pages of Office Action and 7 pages of English translation.

Office Action Received for Korean Patent Application No. 2009-0058907, mailed on Nov. 15, 2010, 4 pages of English translation.

Notice of Allowance Received for Korean Patent Application No. 2009-0058907, mailed on Apr. 25, 2011, 2 pages of Notice of Allowance and 1 page of English translation.

Office Action Received for Japanese Patent Application No. 2009-152990, mailed on Jan. 17, 2012, 3 pages of Office Action and 4 pages of English Translation.

Office Action Received for Chinese Patent Application No. 200910139641.4, mailed on Jul. 12, 2012, 3 pages of Office Action and 2 pages of English Translation.

Office Action Received for the Japanese Patent Application No. 2009-152990, mailed on Jul. 3, 2012, 2 pages of Office Action and 2 pages of English Translation.

Office Action received for CN Application No. 200910139641.4, dated Dec. 19, 2011, 13 pages, including 6 pages of English translation.

Office Action Received for the Japanese Patent Application No. 2009-152990, mailed on Nov. 6, 2012, 3 pages of Office Action 3 pages of English Translation.

Office Action received for Taiwan Patent Application No. 098121615, mailed on Jul. 30, 2013, 1 page of Search Report and 7 pages of Office Action.

Notice of Allowance received for Chinese patent Application No. 200910139641.4, mailed on Feb. 26, 2013, 2 pages of English Translation and 2 pages of Office Action.

* cited by examiner

POWER EFFICIENT HIGH FREQUENCY DISPLAY WITH MOTION BLUR MITIGATION

FIELD

The present disclosure generally relates to the field of electronics. More particularly, an embodiment of the invention relates to power efficient, high frequency displays with motion blur mitigation.

BACKGROUND

Portable computing devices are gaining popularity, in part, because of their decreasing prices and increasing performance. Another reason for their increasing popularity may be due to the fact that some portable computing devices may be operated at many locations, e.g., by relying on battery power. However, as more functionality is integrated into portable computing devices, the need to reduce power consumption becomes increasingly important, for example, to maintain battery power for an extended period of time.

Moreover, some portable computing devices include a liquid crystal display (LCD) or "flat panel" display. One of the main limitations of a conventional LCD panel is motion blur, e.g., while displaying fast moving images. This may be due to two attributes of the LCD panels. First, slow response time of the liquid crystals forming the LCD panel may cause motion blur. Second, hold-type characteristics of the pixels in an LCD panel may cause motion blur.

To meet the increasing demand for displaying high quality video on mobile computing devices (which include LCD panels), the refresh rate of such panels may need to be increased to reduce motion blur. However, this may increase power consumption, e.g., due to operations that are performed at higher frequency to meet the higher refresh rate. As a result, an LCD may consume a significant portion of the reserved battery power at higher refresh rates.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some of the embodiments discussed herein may provide efficient mechanisms for reducing motion blur in display devices (such as LCDs or flat panel displays), e.g., while maintaining power efficiency. In an embodiment, the refresh rate of display devices may be dynamically modified, e.g., to reduce power consumption and/or reduce motion blur. In some embodiments, quality is improved for moving images over systems that do not support high rate displays, while power consumption is reduced over systems that support high rate displays.

As discussed above, one of the main limitations of a conventional LCD panel is motion blur, e.g., while displaying fast moving images. This may be due to two attributes of the LCD panels. First, slow response time of the liquid crystals forming the LCD panel may cause motion blur. More particularly, the final intensity corresponding to a pixel value may not be reached within a frame time, which results in blurred images when displaying fast moving content on these panels. This shortcoming may be improved by the Response Time Compensation (RTC) technique as discussed below, which involves overdriving or underdriving the pixel based on the current pixel value and the previous pixel value. RTC may be provided in hardware, software, or combinations thereof in various embodiments. Second, hold-type characteristics of the pixels in an LCD panel may cause motion blur. More particularly, unlike cathode ray tubes (CRTs), which is impulse-type and displays the pixel value for a fraction of the frame time, LCD is hold-type and displays the pixel value for the entire frame duration. This results in motion blur for fast moving objects even if the response time of the LCD is reduced via overdriving or underdriving as described above. In order to minimize the motion blur resulting from this hold-type characteristics, some implementations may employ higher refresh rates for LCD panels (e.g., 120 Hz in an embodiment), with motion-compensated frame-rate conversion (MC-FRC). MC-FRC may, however, require much higher power consumption due to the additional video processing in the decoder engine and faster driving in the panel electronics. Thus, MC-FRCE may not be readily applied to portable computing devices due to the unacceptable battery life impact. To this end, as discussed in more details below with respect to some embodiments, various options for driving a display panel may be dynamically utilized, for example, based on display capabilities, content type (e.g., still versus moving images), user preferences, power state, sensor information, settings, etc.

Figure 1:
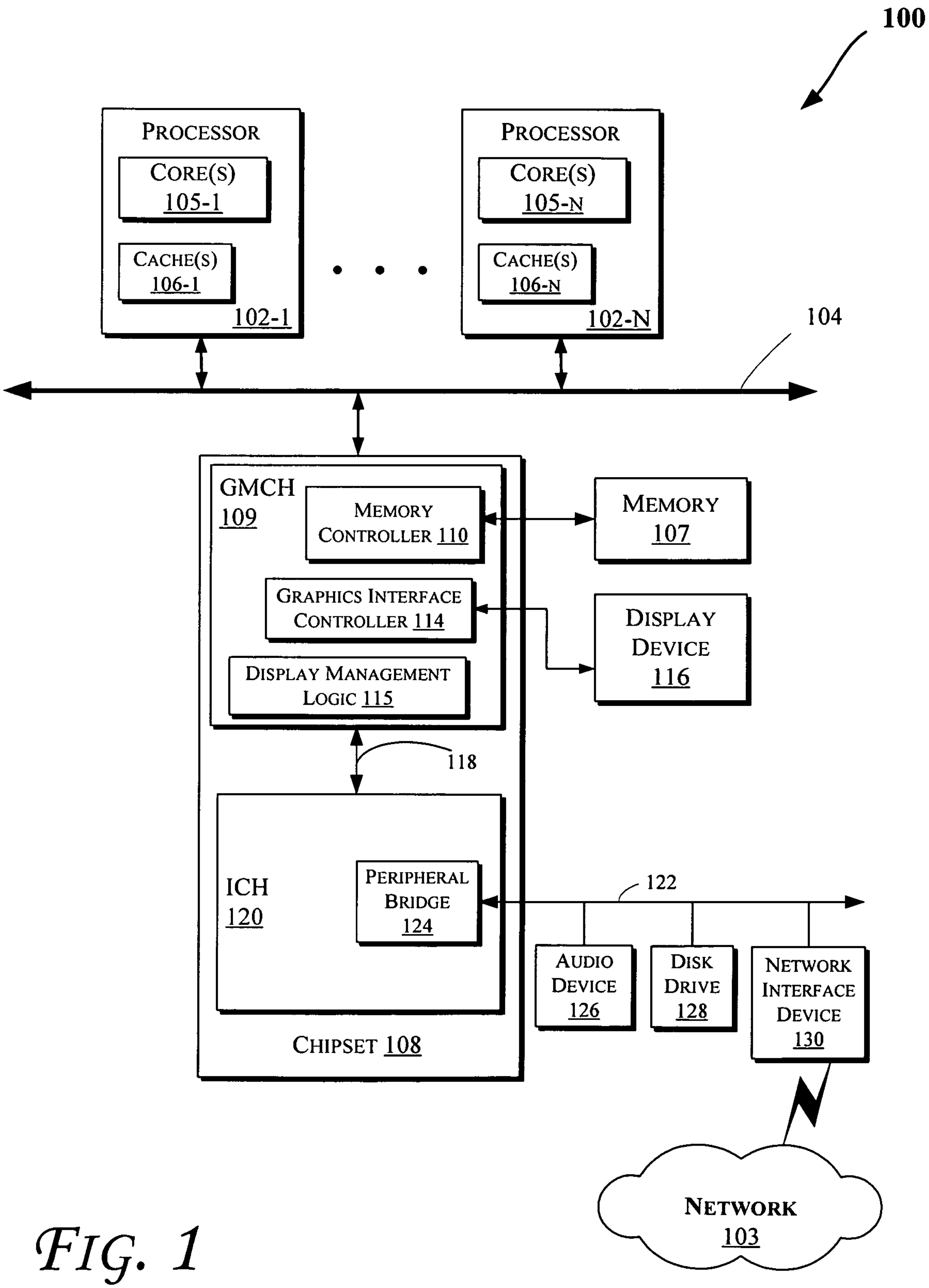
FIGS. 1 and 5 illustrate block diagrams of embodiments of computing systems, which may be utilized to implement various embodiments discussed herein.

Furthermore, some of the embodiments discussed herein may be utilized in various computing systems such as those discussed with reference to FIGS. 1-5. More particularly, FIG. 1 illustrates a block diagram of a computing system 100 in accordance with an embodiment of the invention. The computing system 100 may include one or more central processing unit(s) (CPUs) or processors 102-1 through 102-N (collectively referred to here in as "processor 102" or "processors 102") that communicate via an interconnection network (or bus) 104. The processors 102 may include a general purpose processor, a network processor (that processes data communicated over a computer network 103), or other types of a processor (including a reduced instruction set computer (RISC) processor or a complex instruction set computer (CISC)).

Moreover, the processors 102 may have a single or multiple core design, e.g., one or more of the processors 102 may include one or more processor cores 105-1 through 105-N (collectively referred to here in as "core 105" or "cores 105"). The processors 102 with a multiple core design may integrate different types of processor cores 105 on the same integrated circuit (IC) die. Also, the processors 102 with a multiple core design may be implemented as symmetrical or asymmetrical multiprocessors.

In an embodiment, one or more of the processors 102 may include one or more caches 106-1 through 106-N (collectively referred to here in as "cache 106" or "caches 106"). The cache 106 may be shared (e.g., by one or more of the cores 105) or private (such as a level 1 (L1) cache). Moreover, the cache 106 may store data (e.g., including instructions) that are utilized by one or more components of the processors 102, such as the cores 105. For example, the cache 106 may locally cache data stored in a memory 107 for faster access by components of the processor 102. In an embodiment, the cache 106 (that may be shared) may include a mid-level cache and/or a last level cache (LLC). Various components of the processors 102 may communicate with the cache 106 directly, through a bus or interconnection network, and/or a memory controller or hub.

A chipset 108 may also communicate with the interconnection network 104. The chipset 108 may include a graphics and memory control hub (GMCH) 109. The GMCH 109 may include a memory controller 110 that communicates with the memory 107. The memory 107 may store data, including sequences of instructions that are executed by the processors 102, or any other device included in the computing system 100. In one embodiment of the invention, the memory 107 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 104, such as multiple system memories.

The GMCH 109 may also include a graphics interface controller 114 and a display management logic 115. As will be further discussed herein, e.g., with reference to FIGS. 2-4, the logic 115 may cause the switching of the refresh rate of a display device 116. The graphics interface controller 114 may communicate with the display device 116, e.g., to display one or more image frames corresponding to data stored in the memory 107, data received from the network 103, data stored in disk drive 128, data stored in cache(s) 106, data processed by processor(s) 102, etc. The display device 116 may be any type of a display device, such as a flat panel display (including an LCD, a field emission display (FED), or a plasma display) or a display device with a cathode ray tube (CRT). In one embodiment of the invention, the graphics interface controller 114 may communicate with the display device 116 via a low voltage differential signal (LVDS) interface, DisplayPort (which is a digital display interface standard (approved May 2006, current version 1.1 approved on Apr. 2, 2007) put forth by the Video Electronics Standards Association (VESA)), a digital video interface (DVI), or a high definition multimedia interface (HDMI). Also, the display device 116 may communicate with the graphics interface controller 114 through, for example, a signal converter that translates a digital representation of an image stored in a storage device such as video memory (e.g., coupled to the GMCH 109 or display device 116 (not shown)) or system memory (e.g., memory 107) into display signals that are interpreted and displayed by the display device 116.

A hub interface 118 may allow the GMCH 109 and an input/output control hub (ICH) 120 to communicate. The ICH 120 may provide an interface to I/O devices that communicate with the computing system 100. The ICH 120 may communicate with a bus 122 through a peripheral bridge (or controller) 124, such as a peripheral component interconnect (PCI) bridge, a universal serial bus (USB) controller, or other types of peripheral bridges or controllers. The bridge 124 may provide a data path between the CPU 102 and peripheral devices. Other types of topologies may be utilized. Also, multiple buses may communicate with the ICH 120, e.g., through multiple bridges or controllers. Moreover, other peripherals in communication with the ICH 120 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 122 may communicate with an audio device 126, one or more disk drive(s) 128, and a network interface device 130 (which is in communication with the computer network 103). Other devices may communicate via the bus 122. Also, various components (such as the network interface device 130) may communicate with the GMCH 109 in some embodiments of the invention. In addition, the processor 102 and the GMCH 109 may be combined to form a single chip. Furthermore, the graphics controller 114 and/or logic 115 may be included within the display device 116 in other embodiments of the invention.

Furthermore, the computing system 100 may include volatile and/or nonvolatile memory (or storage). For example, nonvolatile memory may include one or more of the following: read-only memory (ROM), programmable ROM (PROM), erasable PROM (EPROM), electrically erasable EPROM (EEPROM), a disk drive (e.g., disk drive 128), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 2:
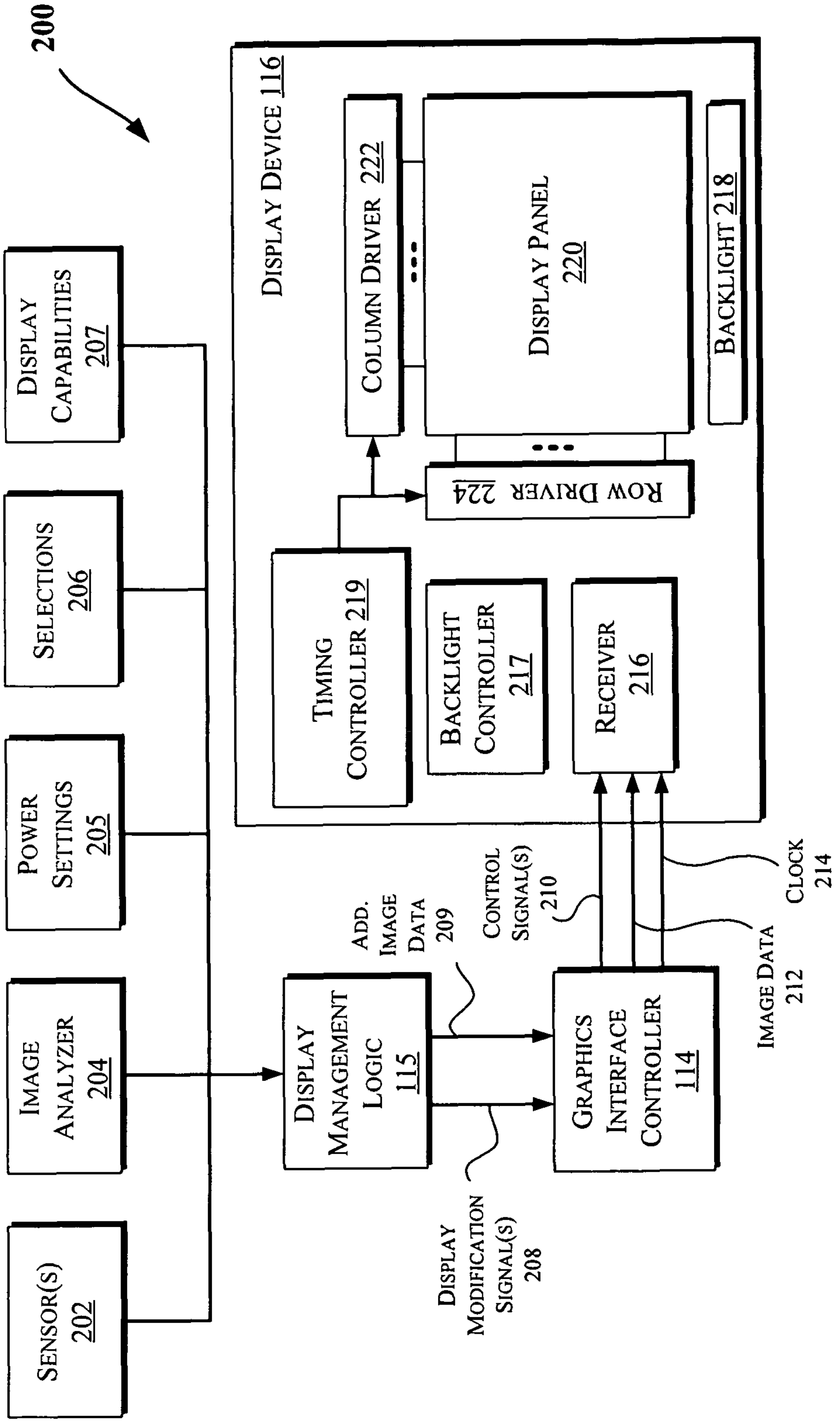
FIG. 2 illustrates a block diagram of portions of a display system, according to an embodiment of the invention.

FIG. 2 illustrates a block diagram of portions of a display system 200, according to an embodiment of the invention. As shown in FIG. 2, the system 200 may include the graphics interface controller 114, the logic 115, and the display device 116.

The logic 115 may receive signals from one or more sensors 202. In an embodiment, one or more sensors 202 may be provided proximate to various components of the computing system 100 of FIG. 1. Each of the sensors 202 may generate a signal to indicate a corresponding ambient light intensity value and/or temperature associated with the component to which the respective sensor 202 is proximate. The logic 115 may also receive one or more signals from an image analyzer logic 204 which may analyze data corresponding to one or more image frames, e.g., to detect motion/stillness and/or determine image content (such as luminance, color, contrast, etc.). In an embodiment, some information may be known from the OS, a priori without having to analyze the frames. Based on its analysis of various frames, the image analyzer 204 may indicate to the display management logic 115 (e.g., via one or more signals) a refresh rate suitable for displaying one or more frames, whether to insert a blank or black frame (also referred to herein as BFI (Black Frame Insertion), whether to insert one or more frames (such as an interpolated frame (also referred to herein as FI (Frame Interpolation)) between select frames, turn on/off backlight (BL) (or set the backlight to some intermediate value), etc. In an embodiment, the image analyzer may provide interpolated frame(s) to the logic 115. Alternatively, logic 115 (or other logic within system 100 of FIG. 1, system 200 of FIG. 2, and/or system 500 of FIG. 5) may provide the interpolated frame(s).

The logic 115 may further receive one or more signals corresponding to one or more power settings 205, which may be stored in a storage device such as those discussed with reference to FIG. 1. In an embodiment, the power settings 205 may be provided: by a power management policy; based on information derived from monitoring system power states (or processor or system component activity); by a user; in accordance with current system power states or settings; based on the current power source (such as an alternating current (AC) power source or a direct current (DC) power source (e.g., a battery)) based on charge level of one or more battery backs coupled to the system 200; otherwise predefined; or combinations thereof. Additionally, the logic 115 may receive one or more signals that are generated in response to one or more selections/settings 206 (such as user or application selected refresh rate, backlight setting/levels, etc., which may correspond to value(s) stored in a storage device such as those discussed with reference to FIG. 1). Moreover, the selections 206 may be provided by an instruction (that may correspond to a software application or software program) executing on one of the cores 105 of FIG. 1. As shown in FIG. 2, the logic 115 may also be coupled to receive information regarding capabilities of display device 116 (such as information regarding display resolution(s), display refresh rate(s), backlight levels, etc.). In an embodiment, information regarding display capabilities 207 may correspond to value(s) stored in a storage device such as those discussed with reference to FIG. 1. In one embodiment, values corresponding to settings/selections (205, 206) and/or capabilities may be stored at system initialization or startup.

Figure 3:
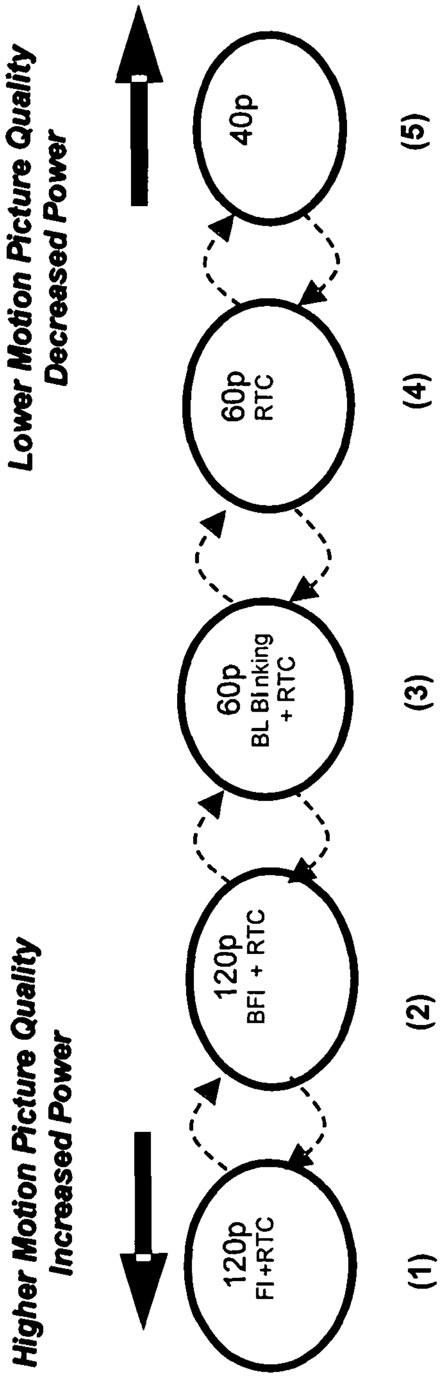
FIG. 3 illustrates a spectrum of some options for trading off power versus moving image quality, in accordance with an embodiment.
Figure 4:
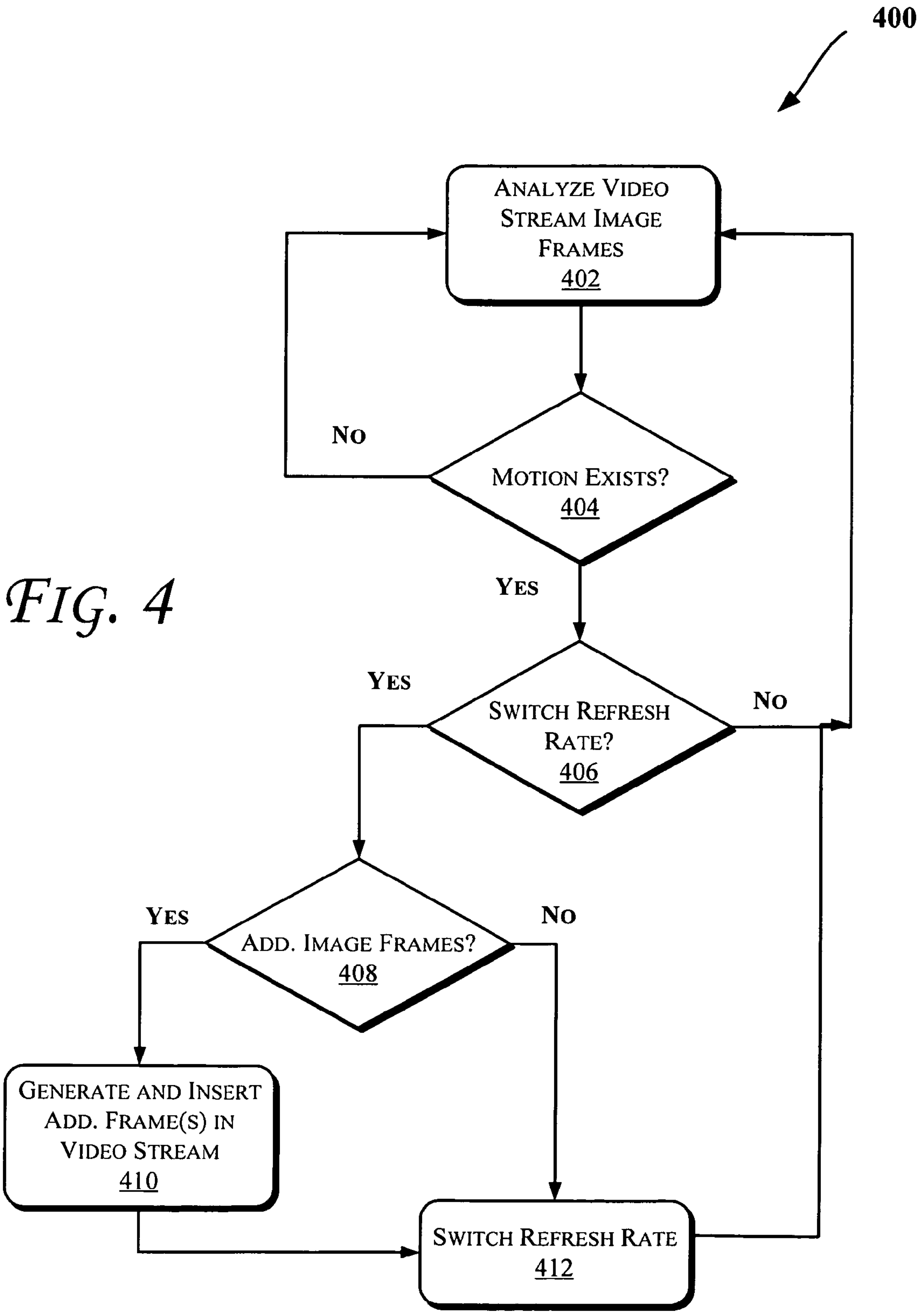
FIG. 4 illustrates a flow diagram of an embodiment of a method to modify the refresh rate of a display device, according to an embodiment.

As will be further discussed herein, e.g., with reference to FIGS. 3 and 4, the logic 115 may generate one or more display modification signals 208 (for example, based on the signals received from sensor(s) 202, image analyzer 204, power settings 205, selections 206, display capabilities 207, or any combination thereof) to indicate to the graphics interface controller 114 that one or more operational settings of the display device 116 is to be modified. The logic 115 may also generate additional image data 209, e.g., based on analysis performed by the image analyzer 204 such as discussed in more detail above.

In an embodiment, the refresh rate of the display device 116 may be increased to improve performance and/or decreased to reduce power consumption by the display device 116, and potentially any corresponding circuitry (such as the memory 107 that may store data corresponding to images displayed on the display device 116). Also, in some embodiments, backlight of the display device 116 may be turned off/on to conserve power or increase brightness, respectively (or set the backlight to some intermediate value). Moreover, the logic 115 may cause one or more blank/black or interpolated frames (for example, based on the additional image data 209) to be inserted in between other frames (e.g., as determined by the image analyzer 204 such as discussed in more detail above).

In one embodiment, if the sensors 202 indicate a temperature value that is higher than a threshold temperature, the logic 115 may indicate to the controller 114 that the refresh rate or backlight level of the display device 116 is to be reduced to reduce power consumption and, hence, to reduce the heat generated by operation of the display device 116 and any corresponding circuitry. In an embodiment, if the sensors 202 indicate an ambient brightness value that is higher than a threshold brightness, the logic 115 may indicate to the controller 114 that the refresh rate or backlight level of the display device 116 is to be increased to improve image quality.

Also, if the image analyzer logic 204 indicates that the motion present between various image frames is above a threshold value, the logic 115 may indicate to the controller 114 that the refresh rate of the display device 116 is to be increased to reduce any artifacts that may be visible to an unaided human eye. Further, if the logic 115 may indicate to the controller 114 that the refresh rate of the display device 116 is to be decreased or increased in accordance with various power settings 205 and/or selections 206.

As illustrated in FIG. 2, the controller 114 may provide one or more control signal(s) 210 (e.g., including a backlight level signal (to indicate whether backlight should be turned on or off, or set to some other intermediate value) and/or a display enable (DE) signal which may indicate when valid image data is present), image data signal(s) 212 (e.g., which may correspond to image data that is to be reproduced by the display device 116 for viewing by a user, including for example the additional image data 209), and a clock 214 (e.g., to synchronize signals between the controller 114 and receiver 216 or other logic within system 200) to a receiver 216. The image data 212 may be progressive or interlaced in various embodiments. Also, the image data 212 may be provided in accordance with a low voltage differential signal (LVDS) interface or DisplayPort, in an embodiment.

As shown in FIG. 2, the display device 116 may also include a backlight controller 217 which may control the level of a backlight 218, e.g., in accordance with control signal(s) 210. In an embodiment, the backlight 218 may be an LED (Light Emitting Diode) backlight. Moreover, in an embodiment, the receiver 216 may provide the DE signal (210) and the image data 212 to a timing controller (TCON) 219. The timing controller 219 may drive the display panel 220 in accordance with the image data 212 and DE signal, e.g., through the column driver 222 and row driver 224. The display device 116 may also include a DE management logic (not shown) to cause the DE signal to be ignored or disregarded (e.g., internally to the display device 116 and independent of the signal provided by the controller 114) after the display device 116 loses a lock of a incoming image signal (such as the clock signal 214 and/or image data signal 212). This may allow the display panel 220 to continue displaying the previous image until a new image is available for displaying. In an embodiment, the controller 219 may drive a plurality of pixels of the display panel 220 to the same level (e.g., providing a blank/black display) if the display device 116 fails to lock onto an incoming image signal (such as the clock signal 214 and/or image data signal 212) prior to expiration of a specified time period that follows the previously displayed image frame. In an embodiment, the DE management logic may be provided in the controller 219 in an embodiment. Alternatively, the DE management logic may be provided elsewhere in the system 200. Also, in accordance with one embodiment, one or more of the components 202, 204, 205, 206, 207, 114, and/or 115 may be provided within the display device 116.

In an embodiment, a display device may be dynamically driven at 120 Hz (or some other high data rate) in order to improve video quality, based on the current content and/or the power state of the system, e.g., displaying with the best quality when possible and extending battery life over a system that drives a display device at 120 Hz without regard to content or power state. Accordingly, in some embodiments, a display device (such as display 116) may be capable of displaying images at variable refresh rates, including up to a 120 Hz refresh rate. Further, a display controller (e.g., controller 114) may be capable of driving a display (e.g., display 116) with up to a 120 Hz refresh rate. Additionally, software, hardware, or combinations thereof (such as various logic discussed with reference to FIGS. 1-2) may control the overall operation of driving the display in a power efficient manner while maintaining the best possible quality.

In an embodiment, the controller 114 (e.g., in combination with logic 115) may have one or more of the following capabilities:

(a) Capability of inserting additional frames (including blank/black frame(s)) into an existing video stream such that the video frame rate is increased to match the display rate (such as discussed with reference to the image analyzer 204 and/or logic 115 above).

(b) Capability of generating frames to be inserted into an existing video stream by interpolating the data within the existing video stream, e.g., allowing any motion to be viewed smoothly (such as discussed with reference to the image analyzer 204 and/or logic 115 above).

(c) Capability of inserting black frames into an existing video stream, whose rate is half the frame rate, such that the frame rate of the video stream is increased to match the display rate and every other frame is a black frame (such as discussed with reference to the image analyzer 204 and/or logic 115 above which may introduce black frames through additional image data 209 which is subsequently incorporated by logic 115 into image data 212).

(d) Capability of controlling the backlight (e.g., backlight 218) level of a display (e.g., through backlight controller 217), so that the backlight is on (or at higher levels) for some frames and off (or at lower levels) for other frames (e.g., where the switching of backlight on/high or off/low is synchronized to the display frame).

(e) Capability of controlling the backlight of a display so that the backlight is on for part of the frame and off for part of the frame. The duty cycle and rate may be variable. For example, the start of the first cycle may be synchronized to the display frame to allow for a variable delay from the start of frame.

FIG. 3 illustrates a spectrum of some options for trading off power versus moving image quality, in accordance with an embodiment. In some embodiments, the above discussed components and capabilities with reference to FIGS. 1-2, including display device capabilities, a portable computing device (e.g., operating on battery power) may be capable of driving a high frequency rate display in one of a spectrum of options trading off power versus moving image quality, some of which are shown in FIG. 3.

As illustrated in FIG. 3, one of the sample options (1) through (5) for driving the display may be selected based on various criterion (such as discussed with reference to FIG. 2) including display capabilities, whether a still or moving image is being displayed, user preference, the power state of the system, etc. Some of the options include, but are not limited to:

(1) High rate drive (e.g., at 120 Hz progressive (120p)) with frame interpolation and RTC (Response Time Compensation), e.g., as determined by the image analyzer 204 and/or logic 115. RTC generally involves overdriving or underdriving the pixel based on the current pixel value and the previous pixel value. RTC may be provided in hardware, software, or combinations thereof in various embodiments. For example, in an embodiment, one or more of the image analyzer 204 and/or logic 115 may cause overdriving or underdriving pixel (s) of the display panel 220.

(a) Highest power, Best Quality for moving images (b) Requires high rate panel (2) High rate drive with Black Frame Insertion (BFI) (such as discussed above) and RTC (a) Medium Power, Medium Quality for moving images (b) Requires high rate panel (c) Video engine operates at half the display rate, saving power (3) 60 Hz drive using LED (Light Emitting Diode) backlight blinking for BFI and RTC (a) Medium Power, Medium Quality for moving images (b) Requires backlight blinking support in panel (e.g., in backlight controller 217)

(4) 60 Hz drive with RTC (without backlight blinking)

(a) Lower Power, Lower Quality for moving images (5) 60 Hz or lower drive without backlight blinking or RTC (a) Lowest Power, Lowest Quality for moving images As shown in FIG. 3, the lowest sample refresh rate is 40 Hz and the highest sample refresh rate is 120 Hz. However, other refresh rates may be utilized other than those discussed herein. For example, the highest refresh rate may be higher than 120 Hz, e.g., at 150 Hz, 180 Hz, 210 Hz, 240 Hz, etc. FI indicates frame interpolation. BFI indicates black frame insertion. BL indicates backlight.

Furthermore, each bubble in FIG. 3 illustrates a possible choice for driving the display and may be considered a display drive state. The farther right the chosen state is, the less power will be consumed by the display subsystem and the lower the motion picture quality will be. The farther left the chosen state is, the higher the motion picture quality will be but more power will be consumed by the display subsystem. In some embodiments, one of these display drive states may be selected based on the display capabilities, whether a still or moving image is being displayed, user preferences, the power state of the system, etc.

FIG. 4 illustrates a flow diagram of an embodiment of a method 400 to modify the refresh rate of a display device, according to an embodiment of the invention. In an embodiment, various components discussed with reference to FIGS. 1-3 and 5 may be utilized to perform one or more of the operations discussed with reference to FIG. 4. For example, the method 400 may be used to modify the refresh rate of the display device 116 in accordance with directions from the logic 115 of FIGS. 1-2.

Referring to FIGS. 1-4, at an operation 402, a plurality of image frames of a video stream may be analyzed. In an embodiment, the video stream may contain image frames received over the network 103, stored in one or more storage devices discussed herein, processed by one or more of processors (e.g., processors 102), etc. At an operation 404, it may be determined whether motion exists in the video stream (e.g., at least within the plurality of image frames that were analyzed at operation 402). For example, the image analyzer 204 may analyze two or more image frames of a video stream (402) to be displayed on the display device 116 to determine (404) if motion exists. If motion exists, an operation 406 may determine whether to switch refresh rate of the display device that is to display the video stream. For example, the display management logic 115 may determine (406) whether to cause switching of the refresh rate of the display panel 220 in accordance with one or more signals received from components 202 through 207, as discussed with reference to FIG. 2.

At an operation 408, it may be determined whether one or more image frames are to be inserted into the video stream, e.g., in between the analyzed plurality of images of operation 402. As discussed with reference to FIG. 2, the additional image frames may include one or more of: one or more interpolated image frames and one or more black image frames. At an operation 410, one or more additional frames may be generated and inserted into the video stream (e.g., in between the analyzed plurality of image frames of operation 402). In some embodiments, the logic 115 and/or image analyzer logic 204 may perform one or both of operations 408 or

410. At an operation 412, the refresh rate of the display device 116 may be switched, for example, such as discussed with reference to FIGS. 1-3.

In some embodiments, the refresh rate switching at operation 412 may be performed during vertical blank period or horizontal blank period of the display device 116. For example, the controller 219 may determine whether the last pixel of a portion of the display panel 220 has been driven, e.g., indicating the start of a horizontal blank period (e.g., which may be present between intermediate lines of image data displayed on the display panel 220) or a vertical blank period (e.g., which may be present between the last line of a previous image frame and the first line of the next image frame). If the last pixel has not been driven, the controller 219 may drive the next portion of the display panel 220 (which may be a line of the panel 220 in an embodiment).

In an embodiment, operation 412 may be performed after the last pixel has been driven, e.g., as determined by the controller 114. Further, in an embodiment, at or after operation 412, the panel 220 may display (or freeze) the same image until the receiver 216 is able to lock onto the new frequency of the clock 214. In one embodiment, as discussed with reference to FIG. 2, a DE management logic may cause the DE signal to be ignored or disregarded (e.g., internally to the display device 116 and independent of the signal provided by the controller 114) after the display device 116 loses a lock of a incoming image signal (such as the clock signal 214 and/or image data signal 212). This may allow the display panel 220 to continue displaying the previous image until a new image is available for displaying. In an embodiment, the controller 219 may drive a plurality of pixels of the display panel 220 to the same level (e.g., providing a blank/black display) if the display device 116 fails to lock onto an incoming image signal (such as the clock signal 214 and/or image data signal 212) prior to expiration of a specified time period that follows the previously displayed image frame.

Figure 5:
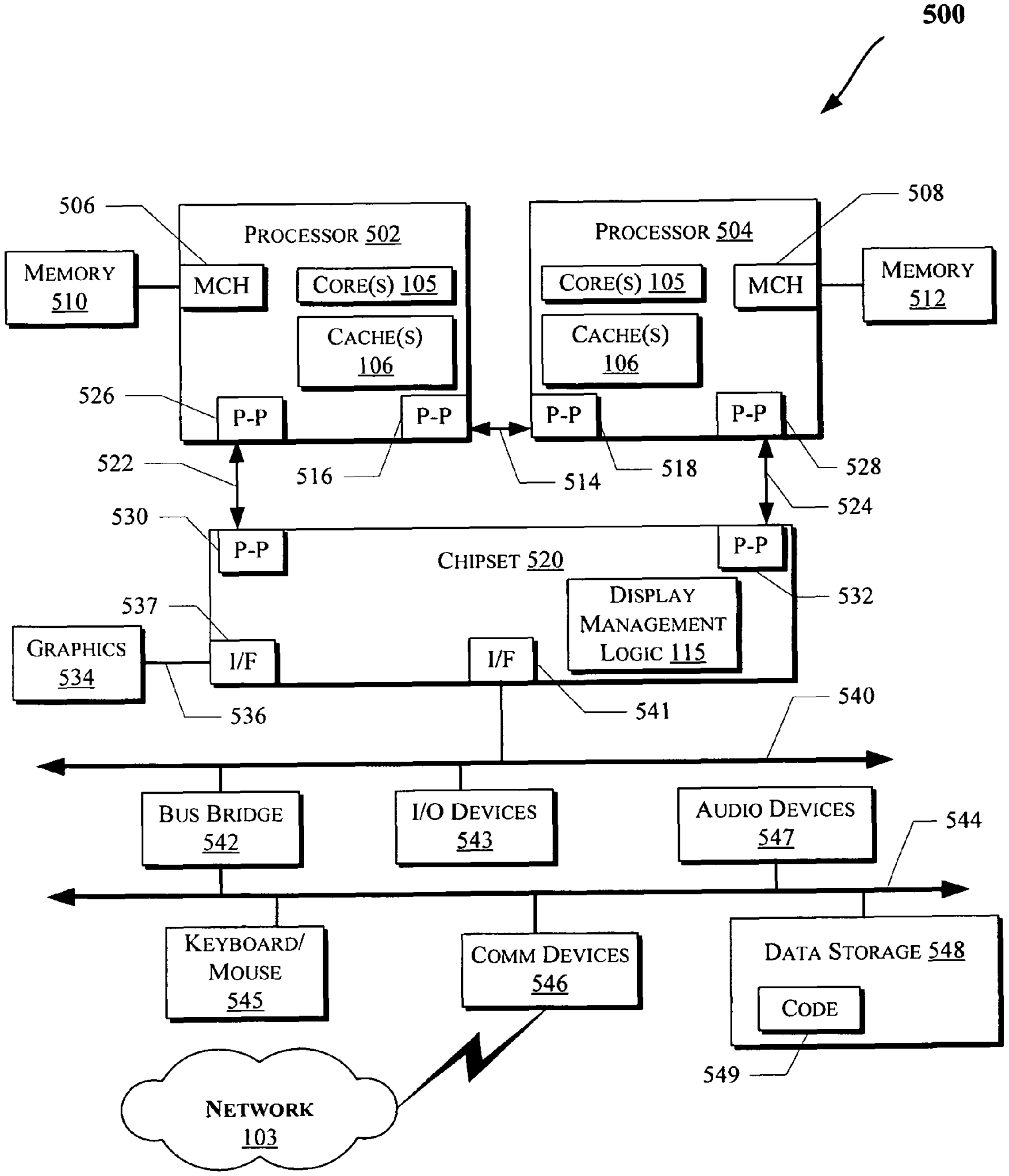

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. In an embodiment, the MCH 506 and/or 508 may be a GMCH such as discussed with reference to FIG. 1. The memories 510 and/or 512 may store various data such as those discussed with reference to the memory 107 of FIG. 1.

In an embodiment, the processors 502 and 504 may be one of the processors 102 discussed with reference to FIG. 1. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. In an embodiment, the logic 115 may be provided in the chipset 520 although logic 115 may be provided elsewhere within the system 500 such as within processor(s) 502 and/or 504, within MCH/GMCH 506 and/or 508, etc. Also, one or more of the cores 105 and/or caches 106 of FIG. 1 may be located within the processors 502 and 504. Other embodiments of the invention may exist in other circuits, logic units, or devices within the system 500. Furthermore, other embodiments of the invention may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 543 may communicate with other devices such as a keyboard/mouse 545, communication devices 546 (such as modems, network interface devices, or other communication devices that may communicate with the computer network 103), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals, for example, embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:

a first logic to analyze a plurality of image frames of a video stream, to be displayed on a display device, to generate a first signal to indicate motion in the plurality of image frames; and a second logic to generate a second signal to switch a refresh rate of the display device from a first refresh rate to a second refresh rate based on: a change in power state associated with the display device and the first signal, wherein the second logic is to generate the second signal based on one or more of: a sensed temperature value or a sensed ambient light intensity value.

2. The apparatus of claim 1, wherein the first logic is to determine whether one or more additional image frames are to be inserted into the video stream.

3. The apparatus of claim 2, wherein the one or more additional image frames comprise one or more of: one or more interpolated image frames or one or more black image frames.

4. The apparatus of claim 1, wherein the power state corresponds to a power state of a computing device that is coupled to the display device.

5. The apparatus of claim 1, further comprising one or more battery packs to supply power to the display device, wherein the power state corresponds to a charge level of the battery packs.

6. The apparatus of claim 1, wherein the second logic is to cause the display device to switch from the first refresh rate to the second refresh rate during one of: a vertical blank period or a horizontal blank period.

7. The apparatus of claim 1, wherein the second logic is to generate the second signal based on one or more of: analysis of image data corresponding to the plurality of frames, one or more capabilities of the display device, one or more selections, or a power setting.

8. The apparatus of claim 7, wherein the one or more selections comprise a user selection or an application selection.

9. The apparatus of claim 1, further comprising a third logic to cause a display enable signal to be disregarded after the display device loses a lock of an incoming image signal.

10. The apparatus of claim 1, wherein the display device comprises a liquid crystal display, a plasma display, or a field emission display.

11. The apparatus of claim 1, wherein the first logic is to determine whether a backlight of the display device is to be turned on or off.

12. A method comprising:

generating a first signal in response to determining that motion exists in a plurality of image frames of a video stream;

determining change in a power state corresponding to a display device that is to display the video stream; and generating a second signal to cause switching of a refresh rate of the display device from a first refresh rate to a second refresh rate in response to the first signal and occurrence of change in the power state, wherein initiating the display refresh rate switching is performed based on one or more of: a sensed temperature value or a sensed ambient light intensity value.

13. The method of claim 12, further comprising determining whether one or more additional image frames are to be inserted into the video stream, wherein the one or more additional image frames comprise one or more of one or more interpolated image frames or one or more black image frames.

14. The method of claim 12, further comprising:

analyzing the plurality of image frames; and determining existence of motion in the video stream based on the analyzing.

15. The method of claim 12, further comprising turning a backlight of the display device on or off.

16. The method of claim 12, wherein initiating the display refresh rate switching is performed based on one or more of: analysis of image data corresponding to the plurality of frames, one or more capabilities of the display device, one or more selections, or a power setting.

17. The method of claim 12, further comprising overdriving or underdriving a pixel of the display device based on a current value of the pixel and a previous value of the pixel.

18. A non-transitory computer-readable medium comprising one or more instructions that when executed on a processor configure the processor to:

determine whether motion exists in a plurality of image frames of a video stream;

determine change in a power state corresponding to a display device that is to display the video stream; and cause switching of a refresh rate of the display device from a first refresh rate to a second refresh rate in response to a determination that motion exists in the plurality of image frames and occurrence of change in the power state, wherein causing the display refresh rate switching is performed based on one or more of: a sensed temperature value or a sensed ambient light intensity value.

19. The non-transitory computer-readable medium of claim 18, further comprising one or more instructions that when executed on the processor configure the processor to determine whether one or more additional image frames are to be inserted into the video stream, wherein the one or more additional image frames comprise one or more of: one or more interpolated image frames or one or more black image frames.

20. The non-transitory computer-readable medium of claim 18, further comprising one or more instructions that when executed on the processor configure the processor to overdrive or underdrive a pixel of the display device based on a current value of the pixel and a previous value of the pixel.

* * * * *

UNITED STATES PATENT AND TRADEMARK OFFICE

CERTIFICATE OF CORRECTION

PATENT NO. : 8,578,192 B2
APPLICATION NO. : 12/165249
DATED : November 5, 2013
INVENTOR(S) : Maximino Vasquez et al.

It is certified that error appears in the above-identified patent and that said Letters Patent is hereby corrected as shown below:

In the Claims

In column 12, line 4, in claim 13, delete “of” and insert -- of: --, therefor.

Signed and Sealed this
Eighteenth Day of February, 2014

Michelle K. Lee

Michelle K. Lee
*Deputy Director of the United States Patent and Trademark Office*